US012783239B2

(12) United States Patent
Horsnell et al.

(10) Patent No.: US 12,783,239 B2
(45) Date of Patent: Nov. 3, 2026

(54) COMPARE COMMAND

(71) Applicant: Arm Limited, Cambridge (GB)

(72) Inventors: Matthew James Horsnell, Cambridge (GB); Thomas Philip Speier, Wake Forest, NC (US); Richard Roy Grisenthwaite, Cambridge (GB)

(73) Assignee: Arm Limited, Cambridge (GB)

( * ) Notice: Subject to any disclaimer, the term of this patent is extended or adjusted under 35 U.S.C. 154(b) by 0 days.

(21) Appl. No.: 18/609,081

(22) Filed: Mar. 19, 2024

(65) Prior Publication Data

US 2025/0298616 A1 Sep. 25, 2025

(51) Int. Cl.
*G06F 9/30* (2018.01)

(52) U.S. Cl.
CPC ........ *G06F 9/30145* (2013.01); *G06F 9/3001* (2013.01); *G06F 9/30021* (2013.01)

(58) Field of Classification Search
None
See application file for complete search history.

(56) References Cited

U.S. PATENT DOCUMENTS 11,106,608 B1 * 8/2021 Williams ............ G06F 9/30101
11,853,755 B2 12/2023 Liljedahl
2005/0071606 A1 * 3/2005 Talyansky ........... G06F 11/3644 717/130
2007/0169123 A1 * 7/2007 Hopkins ................. G06F 9/524 718/100
2010/0318747 A1 * 12/2010 Abts ................... G06F 12/0815 711/144

(Continued)

FOREIGN PATENT DOCUMENTS

WO 2010/012167 2/2010
WO WO-2010012167 A1 * 2/2010 ........... G06F 9/3001

OTHER PUBLICATIONS

Robert Bedichek, "Some Efficient Architecture Simulation Techniques", Department of Computer Science, FR-35, University of Washington, 12 pages.

(Continued)

*Primary Examiner* — Jyoti Mehta
(74) *Attorney, Agent, or Firm* — NIXON & VANDERHYE P.C.

(57) ABSTRACT

An apparatus comprises decoding circuitry to decode a compare-and-conditional-add command identifying a target address, compare data value, and addend data value. Processing circuitry is responsive to the compare-and-conditional-add command to trigger an atomic set of operations to: read a target data value from a storage location corresponding to the target address, and selectively write an updated data value to the storage location in dependence on whether the compare data value satisfies a comparison condition with respect to the target data value. The updated data value comprises a result of an addition of the target data value and the addend data value performed in response to the compare-and-conditional-add command. A comparison condition outcome indication is provided indicating whether the compare data value satisfied the comparison condition. The comparison condition outcome indication comprises at least one of the target data value and the updated data value.

17 Claims, 7 Drawing Sheets

(56) References Cited

U.S. PATENT DOCUMENTS

| | | | | |
|---|---|---|---|---|
| 2011/0161590 | A1 * | 6/2011 | Guthrie | G06F 12/0811 711/144 |
| 2015/0135183 | A1 * | 5/2015 | Kipp | G06F 9/5038 718/103 |
| 2019/0065201 | A1 * | 2/2019 | Robinson | G06F 9/3016 |

OTHER PUBLICATIONS

"Atomic transactions in AMBA CHI", 102714, Issue 01, 2021, 23 pages.
"Intel® Architecture Instruction Set Extensions and Future Features", Programming Reference, 319433-047, Dec. 2022, 174 pages.
D. Kuck et al., "The Cedar System and an Initial Performance Study", Center for Supercomputing Research and Development, University of Illinois, IEEE, 1993, 11 pages.
International Search Report and Written Opinion of the International Searching Authority for PCT/GB2025/050293 mailed May 8, 2025, 14 pages.

* cited by examiner

COMPARE COMMAND

BACKGROUND

Technical Field

The present technique relates to the field of data processing. More specifically, the present technique relates to commands for accessing a memory system.

Technical Background

A data processing apparatus may provide shared data which can be accessed by multiple requesters. For example, locations in a memory system may be readable and writeable by multiple requesters. As system size increases, the number of requesters contending for access to a shared resource can increase, which can lead to problems accessing the shared resource. It would be desirable to allow multiple requesters (e.g. processors) to access and update a shared value. It would be desirable to permit this shared access even as contention increases in systems having greater numbers of requesters.

SUMMARY

At least some examples of the present technique provide an apparatus, comprising: decoding circuitry configured to decode a compare-and-conditional-add command identifying a target address, compare data value, and addend data value; and processing circuitry responsive to the compare-and-conditional-add command to trigger an atomic set of operations to: read a target data value from a storage location corresponding to the target address, and selectively write an updated data value to the storage location in dependence on whether the compare data value satisfies a comparison condition with respect to the target data value read from the storage location, wherein the updated data value comprises a result of an addition of the target data value and the addend data value performed in response to the compare-and-conditional-add command; and the processing circuitry is configured to provide a comparison condition outcome indication indicating whether the compare data value satisfied the comparison condition, the comparison condition outcome indication comprising at least one of the target data value and the updated data value.

At least some examples provide computer-readable code for fabrication of the above apparatus. The code may be provided on a computer-readable medium. The medium may be non-transitory.

At least some examples of the present technique provide a method, comprising: decoding a compare-and-conditional-add command identifying a target address, compare data value, and addend data value; and responsive to the compare-and-conditional-add command, triggering an atomic set of operations comprising: reading a target data value from a storage location corresponding to the target address, and selectively writing an updated data value to the storage location in dependence on whether the compare data value satisfies a comparison condition with respect to the target data value read from the storage location, wherein the updated data value comprises a result of an addition of the target data value and the addend data value performed in response to the compare-and-conditional-add command; and the method comprises providing a comparison condition outcome indication indicating whether the compare data value satisfied the comparison condition, the comparison condition outcome indication comprising at least one of the target data value and the updated data value.

At least some examples provide a non-transitory storage medium storing a computer program for controlling a host data processing apparatus to provide an instruction execution environment, the computer program comprising: decoding program logic configured to decode a compare-and-conditional-add command identifying a target address, compare data value, and addend data value; and processing program logic responsive to the compare-and-conditional-add command to trigger an atomic set of operations to: read a target data value from a storage location corresponding to the target address, and selectively write an updated data value to the storage location in dependence on whether the compare data value satisfies a comparison condition with respect to the target data value read from the storage location, wherein the updated data value comprises a result of an addition of the target data value and the addend data value performed in response to the compare-and-conditional-add command; and the processing program logic is configured to provide a comparison condition outcome indication indicating whether the compare data value satisfied the comparison condition, the comparison condition outcome indication comprising at least one of the target data value and the updated data value.

The computer program may be provided on a computer-readable medium. The medium may be non-transitory.

Further aspects, features and advantages of the present technique will be apparent from the following description of examples, which is to be read in conjunction with the accompanying drawings.

DESCRIPTION OF EXAMPLES

Figure 1:
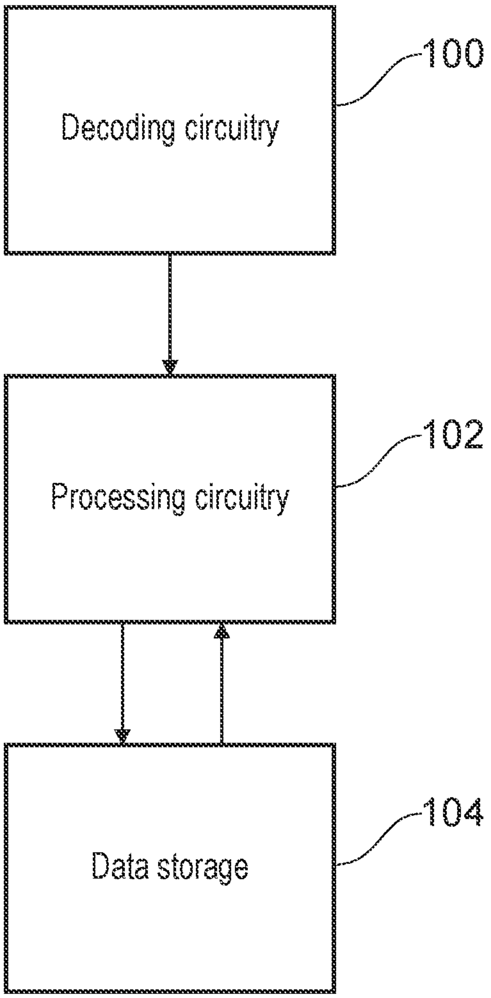
FIG. 1 schematically illustrates an example of a data processing apparatus.

An apparatus according to examples of the present technique comprises decoding circuitry configured to decode a compare-and-conditional-add command. As will be discussed below, the decoding circuitry may include an instruction decoder configured to decode a compare-and-conditional-add instruction, and/or may include circuitry within a memory system component which is configured to decode a compare-and-conditional-add memory system bus command.

The compare-and-conditional-add command identifies a target address, a compare data value, and an addend data value. The target address may identify a storage location within a shared memory which is accessible to several requesters, for example multiple processing elements. Each of the identified values may be identified using either a reference to a register or directly in the compare-and-conditional-add command. For example, the command may identify registers which store an address operand for determining the target address, the compare data value, and the addend data value. The command may instead directly specify one or more of these identified values in the encoding of the command itself (e.g. as an immediate value). A target address may not be specified in full, and in some examples an offset may be specified by the compare-and-conditional-add command which can be combined with a base address to provide the target address.

The processing circuitry is responsive to the compare-and-conditional-add command to trigger an atomic set of operations. The atomic set of operations is observed as an indivisible series of operations performed without interference from other requesters which may have access to an address space including the target address, meaning that the atomic set of operations should provide the same result as would occur if no access from any of the other requesters occurs between the start and end of the atomic set of operations (e.g. write access by other requesters to the storage location associated with the target address can be denied while performing the atomic set of operations, or a mechanism can be provided to detect such intervening write accesses and ensure that the atomic set of operations fails if the intervening access is detected).

The atomic set of operations includes reading a target data value from a storage location corresponding to the target address. The storage location may be a location in memory, or may be a location in cache storage which corresponds to the location in memory identified by the target address. The atomic set of operations also includes selectively writing an updated data value to the storage location in dependence on whether the compare data value satisfies a comparison condition with respect to the target data value read from the storage location. For example, the target data value is compared to the compare data value and the comparison condition is assessed to determine whether the storage location is to be updated. The comparison condition is not particularly limited, and could include determining whether the target data value is less than, equal to, or greater than the compare data value, for example.

The updated data value comprises a result of an addition of the target data value with the addend data value, where the addition is performed in response to the compare-and-conditional-add command. It will be appreciated that addition includes subtraction if one of the addends is a negative value.

Hence, the present technique provides a command for atomically comparing a target data value with a comparison value and selectively adding a value to the target data value depending on the outcome of the comparison. The comparison of the target data value and the subsequent selective writing of the updated data value provides a means of guaranteeing atomicity by ensuring that the write does not succeed if the assumption tested by the comparison does not hold (e.g. because another requester has updated the target data value).

A compare-and-conditional-add command may be particularly useful in processors comprising a plurality of requesters having access to a shared address space, where multiple requesters may attempt to access the same target data value. By providing architectural support for the compare-and-conditional-add command, this provides system designers with the architectural flexibility to implement micro-architectural design options which help to reduce the duration of a period when, for an atomic update of the value at a given target address with the sum of the value and an addend, the atomic operations are vulnerable to failure due to external interference by another requester writing to the storage location associated with the target address. This can be particularly helpful for modern processors, which typically provide a much greater number of requesters and so contention for access to a shared resource becomes a particular problem. Therefore, the inventors have realised that the increasing number of requesters in modern processors justifies the introduction of such a command in an architecture supported by the decoding circuitry, despite the additional complexity which is required for a system to support the command.

The processing circuitry provides, in response to the compare-and-conditional-add command, a comparison condition outcome indication indicating whether the compare data value satisfied the comparison condition. For example, the comparison condition outcome indication may be provided in a manner which is visible to software. If the compare-and-conditional-add command is a memory bus command issued by a requester then the comparison condition outcome indication may be returned to the requester.

The comparison condition outcome indication comprises at least one of the target data value and the updated data value. This can help support more efficient circuit implementation compared to an alternative of setting condition flags in a control register, because in practice the circuitry responsible for selectively writing the updated data value to memory in certain implementations may not have a direct path to set the condition flags, and therefore setting condition flags may not be a particularly efficient or scalable way to provide the comparison condition outcome indication for a compare-and-conditional-add command.

Hence, providing the comparison condition outcome indication comprises returning at least one of the target data value and the updated data value. The target data value indicates whether the updated data has been written to memory, because it is the target data value (together with the compare data value, which should already be known to the entity which issued the compare-and-conditional-add command) which determines whether the comparison condition was satisfied. The target data value has already been read as part of the atomic set of operations and is therefore typically available to the processing circuitry, so returning the target data value may require little additional overhead. Similarly, the updated data value can also serve as an indication of the comparison condition outcome, since the updated data value (i.e. the result of adding the target data value and addend, regardless of whether or not that updated data value was actually written to the storage location corresponding to the target address) is simply a value offset by the target data value by the addend value, and so returning the updated data value would allow the target data value itself and the outcome of the comparison condition to be deduced. The manner in which the target data value and/or the updated data value is returned depends on the implementation, but could involve transmitting the target data value or updated data value over a memory bus to a requester, and/or storing the target data value or updated data value in a register.

Hence, in some examples, the comparison condition outcome indication comprises the target data value regardless of whether or not the compare data value satisfied the comparison condition. In this case, the comparison condition outcome indication indicates the old value of the storage location corresponding to the target address prior to performing the compare-and-conditional-add operation.

In other examples, the comparison condition outcome indication comprises the updated data value regardless of whether or not the compare data value satisfied the comparison condition. In this case, the comparison condition outcome indication indicates the value that would have been written to the storage location if the comparison condition was satisfied, even if the comparison condition is actually not satisfied.

In some examples, the comparison condition outcome indication comprises both: the one of the target data value and the updated data value that corresponds to a final value stored at the storage location associated with the target address following completion of the atomic set of operations, and a comparison condition outcome indicator specifying whether the compare data value satisfied the comparison condition. In this example, the final value can be either the target data value (if the comparison condition was not satisfied) or the updated data value (if the comparison condition was satisfied). In some use cases, future processing may depend on the updated data value in cases where the comparison condition was satisfied and on the target data value in cases where the comparison condition is not satisfied, so it can be useful for the entity issuing the compare-and-conditional-add command to be returned the final value resulting from the selective write performed conditionally based on the comparison condition, as this can reduce the amount of subsequent operations to be applied to generate a value required for future processing. However, as in cases where the final value takes the value of the updated data value, the final value does not itself distinguish whether the final value matches the expected value for the updated data value due to the conditional write being successful following a satisfied comparison condition or because there was external interference on the storage location and the comparison condition failed but the target data value written by the external requester just happened to be the same as the expected value for the updated data value, a separate indication of the outcome of the comparison (e.g. a pass/fail indicator) can be returned, in addition to returning the one of the target data value and updated data value that corresponds to the final value.

The comparison condition may be fixed. However, in some examples there may be several options for the comparison condition and the encoding of the compare-and-conditional-add command may identify the comparison condition. For example, different command variants may be provided for different comparison conditions, distinguished by a command identifier (e.g., the opcode of an instruction). In other examples, the compare-and-conditional-add command may provide a field indicating the comparison condition. In either case, by supporting several comparison conditions, the versatility of the command may be increased. Such comparison conditions could include, for example, equals (satisfied when the target data value equals the compare data value), not equals, greater than, less than, greater than or equals, less than or equals, and so on, and in some implementations may support signed and unsigned versions of comparison conditions such as greater than or less than.

As described above, the atomic series of operations is observed indivisibly. This means that in a system having multiple requesters having access to the same address space, the read, compare and selective write should have the same result as if no other requester has interfered with the storage location associated with the target address in the period between the read and the write. In contrast, if the read and write were triggered by separate commands and were not atomic, then a write access by another requester to the target address could be observed between the read and the write. Providing support for atomic commands can be helpful for use cases where multiple requesters are contending for a shared resource stored in a memory system.

In some examples, the decoding circuitry is provided by an instruction decoder, and the compare-and-conditional-add command is a compare-and-conditional-add instruction defined by an instruction set architecture supported by the instruction decoder. Supporting a compare-and-conditional-add instruction enables software which may access a shared address space to conditionally add to values of that shared address space regardless of contention from other requesters. This therefore provides an improved instruction set architecture for use with systems having contention between requesters. The instruction decoder may be provided in a processor core, and the processing circuitry may be provided in the same processor core, and may perform the addition of the target data value and the addend data value in the processor core. Alternatively, the processing circuitry may be provided in the processor core and be responsive to the decoding of the compare-and-conditional-add instruction to trigger a command or series of commands to instruct circuitry outside of the processor core to perform the atomic set of operations. For example, the processing circuitry may issue a compare-and-conditional-add memory system bus command as discussed below. In yet a further example, the instruction decoder may be provided in the processor core but the processing circuitry may be provided outside the processor core, such as in a memory system component. In this example, the processing circuitry may be more local to the storage location and better placed to carry out the conditional update whilst reducing transfer of data (and the associated overhead and latency) between memory and a processor core.

In examples where the compare-and-conditional-add command is an instruction, the processing circuitry may be configured to return the comparison condition outcome indication (e.g., the target data value or updated data value) to a general purpose register. This can allow the comparison condition outcome indication to be available to software, such that instructions following the compare-and-conditional-add instruction may depend on the comparison outcome indication. Returning the indication to a general purpose register may be more efficient than setting flags in a control register due to the absence of a path to directly update the flags based on a load/store access to a storage location in a memory system, meaning that updating the flags would likely require an extra operation to compare a returned value to generate the flags.

In some examples, the compare-and-conditional-add instruction may be configured to identify architectural registers associated with the compare data value and the addend data value. That is, the compare-and-conditional-add instruction may specify architectural register identifiers which enable to processor to identify registers for obtaining the compare data value and the addend data value. Specifying registers to obtain these values can provide a more compact encoding of the instruction. The target address could be identified in a similar manner.

In some examples, in response to the compare-and-conditional-add instruction, the processing circuitry may be configured to return the target data value or the updated data value to the architectural register used to specify the addend data value. As described above, the target data value acts as a comparison condition outcome indicator enabling the software to determine whether the comparison condition was satisfied. The software may wish to determine whether the comparison condition was satisfied by comparing the target data value (either returned explicitly or deduced from the updated data value) to the compare data value and evaluating the comparison condition. By returning the target data value or updated data value to the addend register, then the number of registers specified by the compare-and-conditional-add instruction can be reduced by re-using a source register as a destination register, whilst still allowing software to make the comparison because the compare data value is not overwritten. In a subsequent comparison instruction, the same architectural registers used as source registers for the compare-and-conditional-add instruction can be used as source registers to evaluate the condition. This approach may help conserve encoding space in the instruction set architecture, compared to a non-destructive encoding which provides separate architectural registers for each of the addend data value, compared data value and a destination register to which the target data value or updated data value is to be returned. Also, while an implementation which returns the target/updated data value to the architectural register used for the compare data value would be possible, it is expected that in most workloads the addend data value is more likely than the compare data value to remain static across multiple iterations of a loop where each iteration requires an atomic set of operations to be performed, so overwriting the addend register rather than the compare data register can reduce the number of additional instructions needed to move values between architectural registers for the purpose of preserving the overwritten value, helping to support better average case performance.

In some systems, the order in which memory access instructions are observed may be important to ensure consistency. For example, a write instruction appearing in program order after a load instruction may need to be observed after the load instruction, so that the correct data is loaded without being overwritten. In some examples, ordering can be imposed using barrier instructions which prevent instructions appearing on one side of the barrier from being observed on a different side of the barrier. Barrier instructions may be used in conjunction with particular types of memory access instruction, and therefore it can be beneficial to combine barriers with memory access instructions to reduce code size.

The compare-and-conditional-add instruction acts as a load instruction, because it causes a target data value to be read from the storage location corresponding to the target address. It can be useful to provide an acquire variant of a load instruction which acts as a barrier to prevent later memory access instructions from being observed before the load instruction. Therefore, in some examples, the instruction decoder may be responsive to at least one variant of the compare-and-conditional-add instruction to control the processing circuitry to prohibit memory access instructions later in program order than the compare-and-conditional-add instruction from being observed earlier than the compare-and-conditional-add instruction. The instruction may act as a one-way barrier, and therefore the processing circuitry may permit memory access instructions earlier in program order than the acquire-variant compare-and-conditional-add instruction to be observed later than the compare-and-conditional-add instruction.

The compare-and-conditional-add instruction can also act as a store instruction, because it can cause updated data to be written to the storage location associated with the target address. It can be useful to provide a release variant of a store instruction which acts as a barrier to prevent earlier memory access instructions from being observed after the store instruction. Therefore, in some examples, the instruction decoder may be responsive to at least one variant of the compare-and-conditional-add instruction to control the processing circuitry to prohibit memory access instructions earlier in program order than the compare-and-conditional-add instruction from being observed later than the compare-and-conditional-add instruction. The instruction may act as a one-way barrier, and therefore the processing circuitry may permit memory access instructions later in program order than the release-variant compare-and-conditional-add instruction to be observed earlier than the compare-and-conditional-add instruction.

In some examples, the decoding circuitry is provided by at least one memory component. The series of operations triggered by the compare-and-conditional-add command may be performed with increased efficiency if the processing circuitry is provided closer to the storage location, for example to reduce a distance over which the read target data has to be transferred. This may reduce the amount of time that the storage location associated with the target address is made inaccessible to other requesters. Therefore in some examples the decoding circuitry (and processing circuitry) may be provided in a component in the memory system, for example outside of a processor core.

Where the decoding circuitry is provided by a memory system component, then a command may be issued to the memory system component from a processor over a memory system bus, instructing the processing circuitry to perform the atomic series of operations. Hence, in some examples, the compare-and-conditional-add command comprises a compare-and-conditional-add memory system bus command which may be decoded by decoding circuitry within a memory system component.

In some examples, the target data value may be stored in a system cache accessible to several requesting devices (e.g., processing cores) in a device having multiple requesters. The shared cache may for example be accessible via an interconnect for maintaining coherency between the requesting devices. In some examples, the compare-and-conditional-add command may be issued by one of the multiple requesters, and at least one instance of the processing circuitry and decoding circuitry may be provided in the interconnect.

In some examples, the target data value may be stored in memory. Therefore in some examples at least one instance of the processing circuitry and decoding circuitry may be provided in a memory controller provided to control access to the memory.

Examples will now be described with reference to the figures.

FIG. 1 schematically illustrates an apparatus for data processing. The apparatus comprises decoding circuitry 100, processing circuitry 102, and data storage 104. As will be described below, particularly with reference to FIGS. 2 and 3, there are several different ways in which these components may be implemented. In general, the decoding circuitry is responsive to a compare-and-conditional-add command to trigger an atomic series of operations for reading a target data value, and selectively updating the target data value by adding an addend to the target data value if the target data value meets a comparison condition.

The inventors have realised that a common idiom in code involves a data value being read from data storage, compared to a compare data value, and conditionally added to if the comparison condition is satisfied. For example, one situation in which such a sequence of events may occur is when a counter is stored in a storage location (e.g., memory) tracking a number of times a certain event has occurred. A requester may check the value of the counter to determine if it meets some criterion (such as whether the counter has reached a threshold), and depending on the outcome may update the counter to indicate a further event. For example, a processor may keep track of the number of times a task has been completed using a counter. The counter may be checked to determine whether the task is to be performed, and if so then the counter may be incremented to indicate that the requester has performed the task a further time.

One way that this compare-and-add sequence of operations could be carried out is using a series of independent instructions which trigger a series of transactions to the memory system. For example, a sequence of instructions may include: a load instruction to load the target data value by triggering a load transaction, a compare instruction to compare the loaded value to a comparison value, an add instruction to update the loaded value, and an atomic compare-and-swap instruction to cause a compare-and-swap transaction to be issued to commit the updated value to memory. The comparison in the compare-and-swap transaction ensures that the loaded value to be updated is still the same as the value used in the compare instruction, before committing the updated value.

The inventors have realised that such a series of instructions is susceptible to interruption when the target data value to be accessed is a shared value which may be accessed by other requesters. For example the target data value may be a shared counter tracking a number of times a task has been completed among a set of processors which may separately perform the task, and therefore may be simultaneously accessed by different requesters. In particular, if, before an updated value can be committed by one requester, a second requester loads the target data value from the same address then this may cause the updated data value held by the first requester to be invalid. Hence, the full sequence of operations cannot be completed and must be retried. This can lead to different processors simultaneously attempting to load and update the same value and interrupting each other, which can cause significant amounts of wasted work.

The inventors have realised that the race condition can be avoided if the series of operations for comparing and conditionally adding to a value could be carried out in an atomic sequence. From the perspective of requesters other than the requester attempting to update the target data value, an atomic sequence of load and conditional write happens in one go, meaning that an access from another requester cannot be observed between the load and the selective addition, meaning that the series of operations cannot be interrupted by contention from another requester.

Also, when the compare-and-add operation is included in a wider sequence of operations which as a whole need to execute atomically (where the overall sequence of operations may be too complex to perform in a single command), then where that sequence is to terminate with writing the sum of the target data value and the addend data value to memory conditional on no interference being detected in the earlier portion of the sequence, typical architectures would normally implement this using a compare-and-swap command which conditionally writes a swap value to memory conditional on the target data value at the target memory location meeting a given comparison condition with a compare operand. However, in such architectures, implementing an approach where the swap value is the sum of the target data value and an addend data value would require additional commands to be executed prior to the compare-and-add command to read out the target data value and perform the addition. Such architectures would be unable to give the hardware any hint that the add is related to the compare-and-swap and so would not support more efficient hardware implementations for reducing the latency of the period within which the overall sequence is vulnerable to external interference that are enabled in response to the conditional-compare-and-add operation as discussed with reference to the ladder diagram discussed in FIG. 4 (such as performing the addition using adding circuitry local to a memory system component or in a load/store unit of a processor core, rather than performing the addition on an arithmetic/logic unit of the processor core which would typically be slower and might be the only option available for a hardware designer if the architecture treated the addition as a separate instruction from the compare-and-swap so that the addition looks like any normal addition that would be scheduled on the arithmetic/logic unit). By supporting implementation options which can enable reduced latency between the read of the target data value and the conditional write of the updated data value depending on an addition, an architecture supporting the conditional-compare-and-add command can therefore support system design which reduces performance cost of managing contention as the number of requesters increases in modern processing systems.

The inventors have recognised that there is therefore significant performance benefit that can be gained by configuring the device to be responsive to a compare-and-conditional-add command to trigger an atomic set of operations for conditionally adding to a target data value. It might appear counter-intuitive to provide a dedicated command for such an operation, but the inventors have realised that in the context of modern processors which can provide large numbers of requesters and therefore can be associated with significant contention, supporting a dedicated compare-and-conditional-add command to trigger an atomic series of operations can provide a significant performance benefit which can outweigh the additional complexity required to support such a command.

The command can be implemented in the apparatus in several ways. As discussed below, a compare-and-conditional-add instruction may be supported by an instruction decoder of the system. The instruction may cause a processor to perform itself an atomic sequence of operations, or could cause the processor to trigger, such as by issuing a compare-and-conditional-add transaction over a memory bus, a memory component to perform the atomic sequence of operations. The memory system component may be more local to the storage location associated with the target address and this may therefore enable the atomic sequence to be carried out in a more efficient manner. Therefore, the decoding circuitry 100 and processing circuitry 102 may be provided in a processor core or a memory system component such as an interconnect or memory controller. The data store 104 may be in memory, or may be a cache storing data which is associated with a target address in memory. The data store 104 could in some examples be a cache within a processor.

Figure 2:
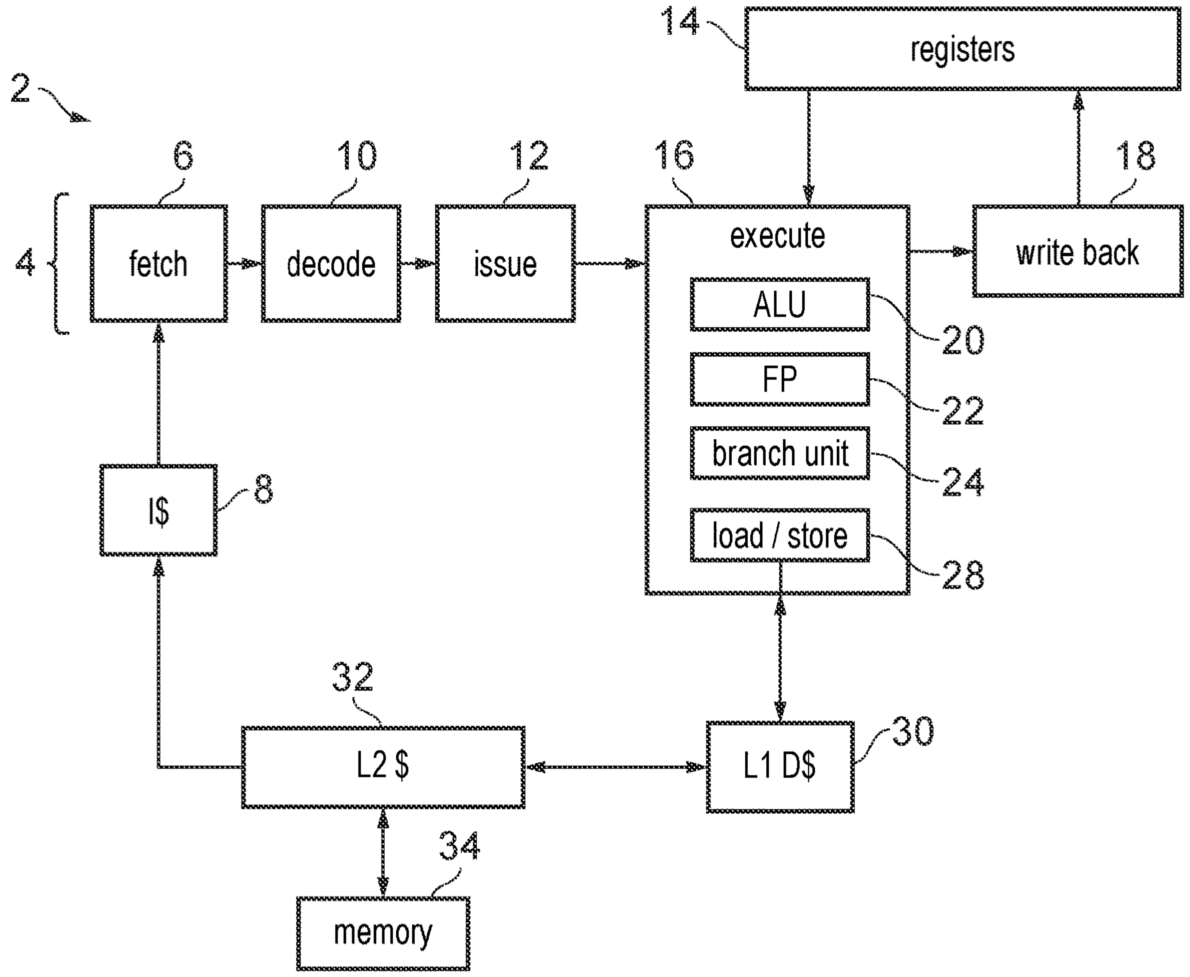
FIG. 2 schematically illustrates an example of a processor supporting a compare-and-conditional-add instruction.

FIG. 2 schematically illustrates an example of a data processing apparatus 2 which may support a compare-and-conditional-add instruction. Other than the memory 34, the apparatus 2 may for example be provided as a processor core as part of a multi-core processor. The data processing apparatus has a processing pipeline 4 which includes a number of pipeline stages. In this example, the pipeline stages include a fetch stage 6 for fetching instructions from an instruction cache 8; a decode stage 10 for decoding the fetch program instructions to generate micro-operations to be processed by remaining stages of the pipeline; an issue stage 12 for checking whether operands required for the micro-operations are available in a register file 14 and issuing micro-operations for execution once the required operands for a given micro-operation are available; an execute stage 16 for executing data processing operations corresponding to the micro-operations, by processing operands read from the register file 14 to generate result values; and a writeback stage 18 for writing the results of the processing back to the register file 14. It will be appreciated that this is merely one example of possible pipeline architecture, and other systems may have additional stages or a different configuration of stages. For example in an out-of-order processor an additional register renaming stage could be included for mapping architectural registers specified by program instructions or micro-operations to physical register specifiers identifying physical registers in the register file 14.

The execute stage 16 includes a number of processing units, for executing different classes of processing operation. For example the execution units may include an arithmetic/logic unit (ALU) 20 for performing arithmetic or logical operations; a floating-point unit 22 for performing operations on floating-point values, a branch unit 24 for evaluating the outcome of branch operations and adjusting the program counter which represents the current point of execution accordingly; and a load/store unit 28 for performing load/store operations to access data in a memory system 8, 30, 32, 34. In this example the memory system include a level one data cache 30, the level one instruction cache 8, a level two cache 32 shared between data and instructions, and main system memory 34. It will be appreciated that this is just one example of a possible memory hierarchy and other arrangements of caches can be provided. The specific types of processing unit 20 to 28 shown in the execute stage 16 are just one example, and other implementations may have a different set of processing units or could include multiple instances of the same type of processing unit so that multiple micro-operations of the same type can be handled in parallel. It will be appreciated that FIG. 2 is merely a simplified representation of some components of a possible processor pipeline architecture, and the processor may include many other elements not illustrated for conciseness, such as branch prediction mechanisms or address translation or memory management mechanisms.

The decode stage 10 of the processor 2 is configured to decode a compare-and-conditional-add instruction, and issue control signals in response to decoding said instruction. The compare-and-conditional-add instruction may identify a target address, compare data value, and addend data value by identifying architectural registers, for which corresponding physical registers are provided in the register file 14.

In some examples, in response to the compare-and-conditional-add instruction the decoder 10 may trigger an atomic series of operations in which: a load transaction is issued by the load/store unit 28 to the memory system to load the target data value for storage in a register 14, the ALU 20 evaluates the comparison condition with reference to the target data value and compare data value in registers 14, the ALU 20 calculates an update data value based on the target data value and the addend value in registers 14, and the LSU 28 selectively writes an updated data value to the storage location depending on the outcome of the comparison.

Figure 3:
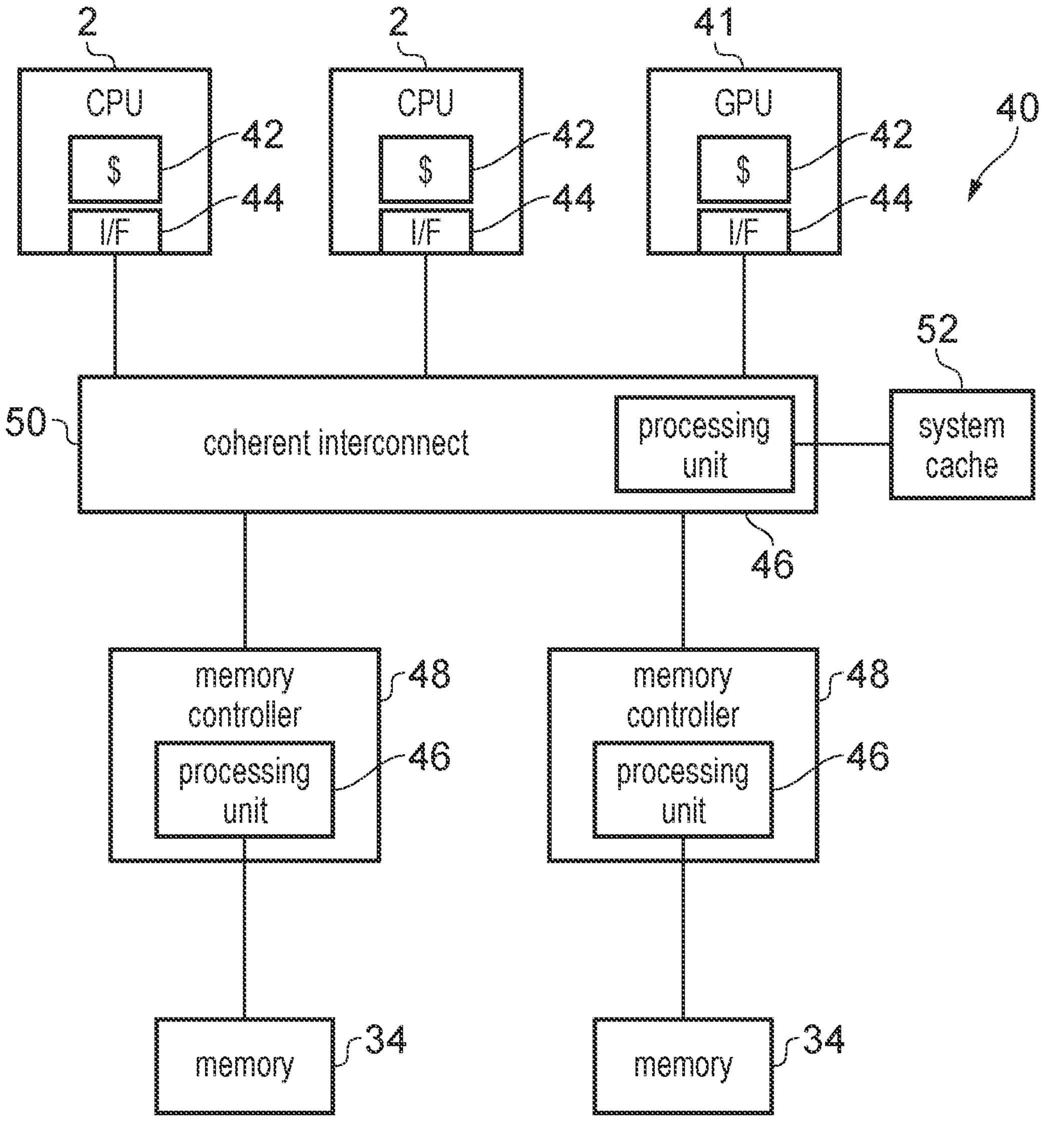
FIG. 3 schematically illustrates an example of a data processing apparatus supporting a compare-and-conditional-add transaction.

In other examples, in response to the compare-and-conditional-add instruction the decoder 10 may cause one or more transactions to be issued over a memory system bus to one or more memory system components in the memory system, to cause the atomic series of operations to be performed by said memory system component, as illustrated in FIG. 3.

FIG. 3 schematically illustrates an example of a data processing apparatus 40 which includes a number of requester devices 2, 41 which share access to a memory system. In this example the requester devices include two central processing units (CPU) 2 (e.g., as shown in FIG. 2) and a graphics processing unit (GPU) 41 but it will be appreciated that other types of requester device could also be provided, e.g. a network interface controller or a display controller for example. The CPUs 2 and GPU 41 each have at least one cache 42 for caching data from a memory system (e.g., the level 1 caches 8, 30 and level 2 cache 32 shown in FIG. 2). The memory system is accessed via a coherent interconnect 50 which manages coherency between the respective caches 42 in the requester devices 2, 41 and any other caches in the system (e.g. a system level cache 52 coupled to the interconnect which is not assigned to any particular requester). When accessing data in its local cache 42, a requester device 2, 41 may send a coherency transaction to the coherent interconnect 50. In response to the transaction, the interconnect 50 transmits snoop requests to other caches if it is determined that those caches could be holding data from the corresponding address, to locate the most up to date copy of the required data and trigger invalidations of out-of-date data or write backs of modified data to memory if required, depending on the requirements of the coherency protocol being adopted. Such snoop requests and invalidations may lead to interruption of sequences of instructions executed for conditionally updating a target data value. If data needs to be fetched from main memory 34, the coherent interconnect 50 may trigger read requests to the memory 34 via one or memory controllers 48, and similarly write to main memory may be triggered by the coherent interconnect 50. The requester devices each have a transaction interface 44 responsible for generating the transactions sent to the interconnect 50 over a memory system bus, and receiving the responses from the interconnect, as well as handling snoop requests triggered by the interconnect in response to transactions issued by other requesters. The interface 44 can be seen as transaction issuing circuitry for generating transactions.

In addition to regular read or write transactions of the coherency protocol which may cause data to be read into the cache 42 or written to memory 34, the system may also support compare-and-conditional-add atomic transactions which are processed by a processing unit 46 lying closer to the location of the stored data. In response to a compare-and-conditional-add atomic transaction, data access circuitry provided in the processing unit 46 reads a target data value from a storage location in a cache 52 or memory 34 identified by a target address, a "far" arithmetic/logic unit (far ALU, distinct from a "near" ALU in the CPU 2) in the processing unit 46 performs a comparison based on the read data value and a compare operand provided by the requesting requester device, the far ALU performing an addition between the read data value and an addend value provided by the requester device, and the data access circuitry selectively writes the updated data value back to the addressed storage location based on the outcome of the comparison. A comparison condition outcome indicator, such as the target data value or the updated data value, is also returned to the requesting requester device. The read, ALU operations, and write take place atomically, so that they are processed as an indivisible series of operations which cannot be partially completed or interleaved with other operations performed on the memory or cache.

When the target data of the atomic transaction is stored in the system cache 52, the transaction may be processed using a processing unit 46 within the interconnect. When the target data is stored in main memory 34, the atomic transaction may be processed by a processing unit 46 within the corresponding memory controller 48. It will be appreciated that the processing unit 46 for processing atomic transactions could also be located elsewhere in the system 40.

Figure 4:
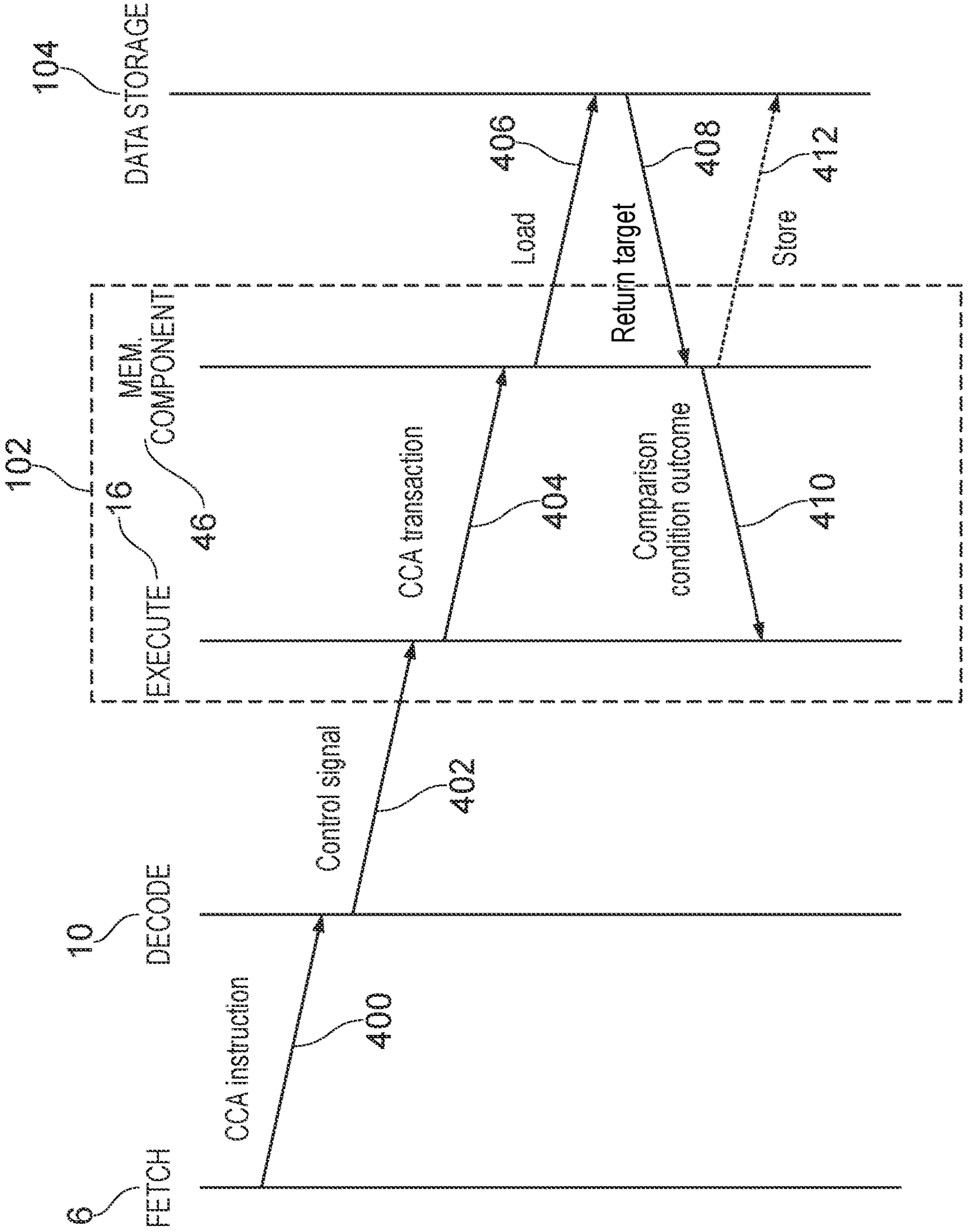
FIG. 4 is a ladder diagram illustrating a process triggered by a compare-and-conditional-add command.

FIG. 4 is a ladder diagram illustrating a process in which a requester device and a memory system component are responsive to a compare-and-conditional-add command.

A system, as shown in FIG. 3, includes several processors as shown in FIG. 2, each comprising a fetch stage 6, decode stage 10, and execute stage 16. At stage 400, a compare-and-conditional-add instruction is fetched by a fetch stage 6 of one of the processors, and is provided to an instruction decode stage 10 (an example of decoding circuitry 100), which decodes the compare-and-conditional-add instruction. In response to the compare-and-conditional-add instruction, at step 402 the decode stage 10 issues control signals to the execute stage 16 of the pipeline. The compare-and-conditional-add instruction identifies the target address, compare data value, and addend data value for example by referencing architectural registers, and may in its encoding also specify the comparison condition. In the example shown in FIG. 4, the execute stage (e.g., the load/store unit 28) is responsive to the control signal 402 to trigger issuing of a compare-and-conditional-add (CCA) transaction over the memory bus to a memory system component. The execute stage 16 issues the compare-and-conditional-add transaction specifying the same target address, compare data value, and addend data value identified by the compare-and-conditional-add instruction. In this way the processor triggers the atomic set of operations to read and selectively add to the target address.

The compare-and-conditional-add transaction specifies the target address, compare data value, and addend data value, and may further specify the comparison condition. The memory system component 46 comprises the decoding circuitry 100 (shown in FIG. 1) configured to decode the compare-and-conditional-add transaction, and in response issue a load request 406 to load the target data value from the storage location, corresponding to the target address, in data storage 104 (e.g., a cache 52 or memory 34). The target data value is returned 408 from the data storage 104, and the processing circuitry 102 within the memory system component 46 can evaluate the comparison condition using the target data value and the compare data value. For example, the target data value may be subtracted from the compare data value to determine which, if any, value is larger by assessing whether the result is positive or negative or zero. The memory system component 46 can also use the target data value to calculate the updated data value by adding the addend. The memory system component may return a comparison condition outcome indication 410 to the processor which issued the compare-and-conditional-add transaction. The comparison condition indication indicates whether the comparison condition was satisfied. The target data value itself may be provided as the comparison condition outcome indication, as it can be compared by the requester with the compare data value (which it may already have access to, as this value was used to issue the compare-and-conditional-add transaction) using the comparison condition to determine if the condition was satisfied or not. Alternatively, the updated data value could be returned to the requester. The updated data value is offset from the target data value by the addend, which was known to the processor which issued the compare-and-conditional-add transaction, and therefore can be used to derive the target data value which can in turn be used to evaluate the comparison condition. Hence, the target data value and updated data value can each act as the comparison condition outcome indication.

In some examples, in addition to the comparison condition outcome indication, which could be the target data value, the updated data value, or a comparison condition outcome indicator (e.g. a single bit flag indicating whether or not the comparison condition was satisfied), the memory system component 46 may also return the final value of the storage location corresponding to the target address following the atomic series of operations. This final value is equal to the target data value if the comparison condition was not satisfied and the updated data value if the comparison condition was satisfied. The final value by itself may not enable the outcome of the comparison condition to be evaluated, but can be useful for the software to use for future processing.

In step 410, the target data value or updated data value, in either case acting as the comparison condition outcome indication, may be returned to the architectural register identified in the compare-and-conditional-add instruction for storing the addend data value.

The memory system component also selectively stores the updated data value to the storage location associated with the target address. If the comparison condition was not satisfied, then the storage location is not updated and continues to store the target data value. If the comparison condition was satisfied, then the storage location is updated to store the updated data value formed by adding the addend data value to the target data value.

It will be appreciated that rather than issuing a compare-and-conditional-add transaction at stage 404, the processor may instead perform the atomic series of operations internally, and therefore may issue internal control signals to the LSU 28 to perform the load, calculation of the updated data value, and selective write operations atomically (e.g. using a local ALU provided within the load/store unit 28 separately from the ALU 20 provided for handling regular ALU instructions). In this case the steps shown to be performed by the memory component in FIG. 4 may also be performed by the execute stage 16 of the processor. Hence, the processor may also act as the processing circuitry 102.

It will be appreciated that the compare-and-conditional add instruction supported in an instruction set architecture and/or compare-and-conditional add bus command supported in an interconnect bus architecture may provide considerable flexibility for system designers to vary the particular way in which to provide circuitry for implementing the compare-and-conditional add operation. However, unlike architectures which do not support the compare-and-conditional-add command, which would not support more efficient implementations such as performing the add operation at far ALU logic at the memory system component 46 because the add would not be signalled as part of the atomic compare operation, by supporting the compare-and-conditional add command there is greater flexibility in implementation options because the compare-and-conditional add command provides the hint to the hardware that the add operation is to be included in an atomic set of operations involving the read, compare and conditional write. This helps support implementations which enable reduced duration of the period within which an atomic sequence of operations would be vulnerable to external interference, as architectures not supporting the compare-and-conditional add command might constrain system designers to implement such sequences using a standalone add instruction processed on the ALU 20 of the processor core, which would tend to increase the latency of the period between an initial load at step 406 and the store of the updated value depending on an addition at step 412. The longer the latency of that period is, the greater chance of the atomic set of operations failing due to contention from another requester, which is particularly problematic in modern processors involving many processor cores 2, 41. Therefore, the architectural support for a compare-and-conditional add command is extremely beneficial in helping supporting better software performance for highly parallel workloads with contention for access to a shared resource between processes executing on a many-core system.

One example of the compare-and-conditional-add instruction has the following encoding:

CCAADD<Xt>, <Xs>, [<Xn|SP>{#0}], <cond> in which Xs identifies a register storing a compare data value and Xt identifies a register storing an addend data value. The portion in square brackets identifies the target address by identifying a register storing a base address <Xn|SP>, and an immediate offset #0. The register storing the base address may be a general purpose register Xn or may be a dedicated register storing a stack pointer SP. The instruction also specifies a comparison condition cond.

The comparison condition may be specified in various ways, such as by providing different variants of the CCAADD instruction (having different opcodes). Alternatively, a field may be provided including a comparison condition specifier. The comparison condition may be an "equals" condition satisfied when the compare data value and target data value are equal, a "greater than" or "less than" condition satisfied when the compare data value is greater than or less than the target data value, and so on.

Variants of the instruction may operate on different size registers. For example, a variant could be provided to operate on 32 bit registers, and a different variant may be provided to operate on 64 bit registers. Both variants may access the same physical registers, but the 32 bit variant may, for example, cause the processor to ignore the upper 32 bits of the register.

Variants of the instruction may also act as one-way barrier instructions. An acquire variant may prevent memory access instructions (load and store instructions) later in program order from being observed earlier than the acquire variant of the compare-and-conditional-add instruction. A release variant may prevent memory access instructions earlier in program order from being observed later than the acquire variant.

A sequence of code may include the compare-and-conditional-add instruction and subsequent instructions to determine whether the comparison condition was satisfied. Such a sequence of code may be as follows:

```
CCAADD <Xt>, <Xs>, <Xn>, <cond>
CMP Xt, Xs ; Compare old value of memory location, returned to
        ; Xt by the CCAADD instruction, with compare data
        ;value stored in Xs
B.<!cond> <failure> ; test for failure with !cond, branch if
        ; condition not satisfied
; success path
   failure:
; failure path
```

Hence, a compare instruction and branch instruction can be used after the CCAADD instruction to check the returned target data value to assess whether the condition was satisfied (and therefore the updated data value was written to the storage location associated with the target address) or not. The compare instruction sets condition flags in a control register which can be checked by the subsequent branch instruction to evaluate the condition. It will be understood that this comparison is separate from the evaluation of the comparison condition triggered by the compare-and-conditional-add command, and is for informing software of the outcome rather than for determining whether the target location is to be updated.

It will be appreciated that the branch instruction could instead test for success and branch to the success path.

Figure 5:
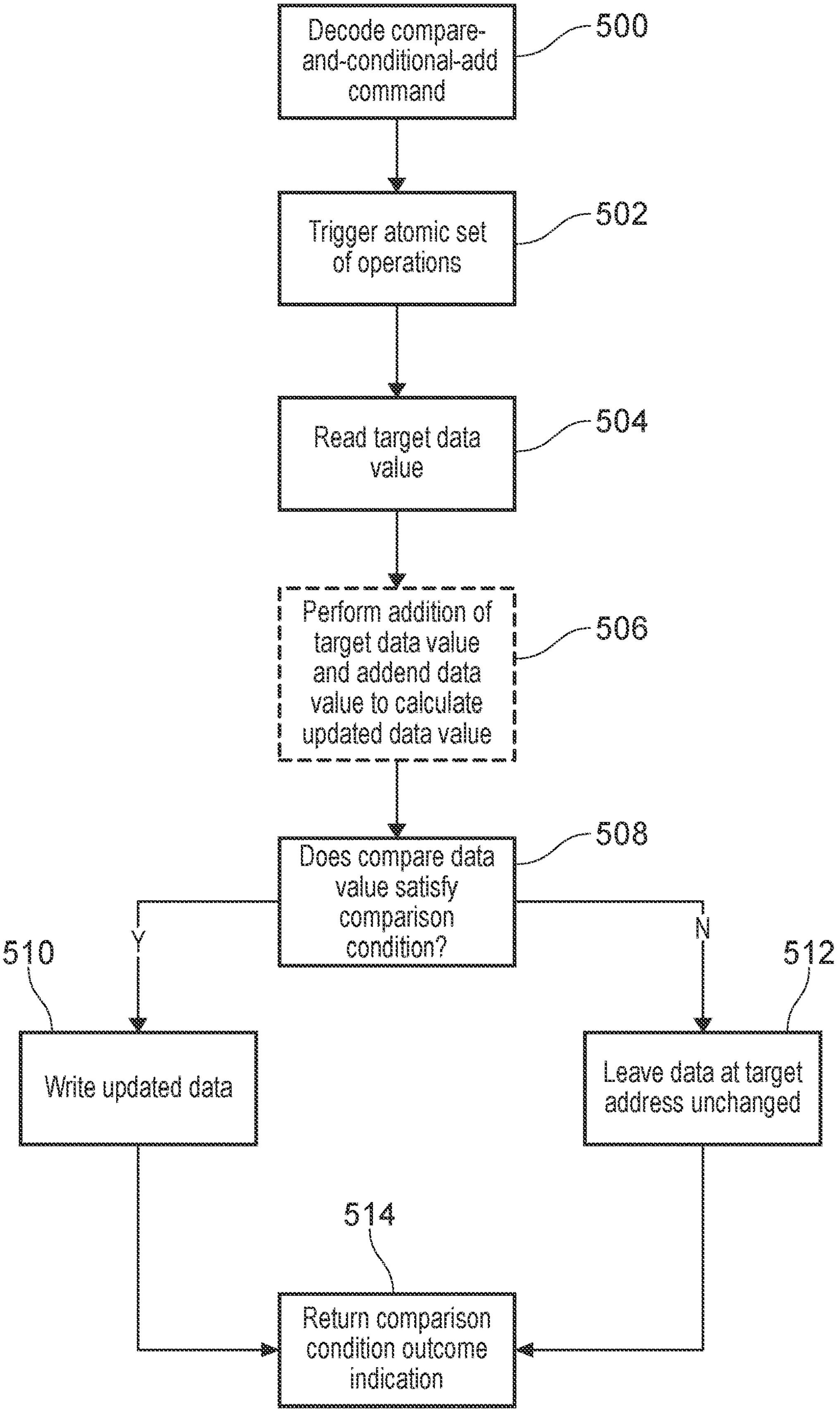
FIG. 5 is a flow diagram illustrating a process triggered by a compare-and-conditional-add command.

FIG. 5 is a flow diagram illustrating a process triggered by a compare-and-conditional-add command. At step 500 the compare-and-conditional-add command is decoded by decoding circuitry 100, specifying a target address, addend data value, and compare data value. At step 502, an atomic series of operations is triggered by the decoding circuitry 100, to be performed by processing circuitry 102.

At step 504, a target data value is read from a storage location in data storage 104, the storage location corresponding to the target address.

At step 506, an addition is performed between the target data value read from the storage location, and the addend data value specified by the compare-and-conditional-add command. Step 506 is shown in a dashed box, because in some examples this addition may be conditional on the comparison condition being satisfied. However, in other examples the atomic series of operations may be completed quicker if the addition is performed without waiting for the outcome of the comparison to be determined, and if the comparison is thereafter found not to be satisfied then the updated data value may simply be discarded.

At step 508, the compare data value and the target data value are compared to determine whether the comparison condition is satisfied.

If the comparison condition is satisfied, then at step 510 the updated data value calculated at step 506 is written to the storage location associated with the target address.

If the comparison condition is not satisfied, then at step 512 the data at the storage location associated with the target address is left unchanged.

In either case at step 514 a comparison condition outcome indication is provided to indicate the outcome of the comparison condition. For example the target data value or updated data value may be provided to a register accessible to software.

It will be appreciated that the steps shown in FIG. 5 may be carried out in parallel, or in a modified order. For example step 514 is not dependent on steps 510 or 512 and can be performed directly after step 508. Similarly, step 506 may be performed after step 508 as discussed above.

Figure 6:
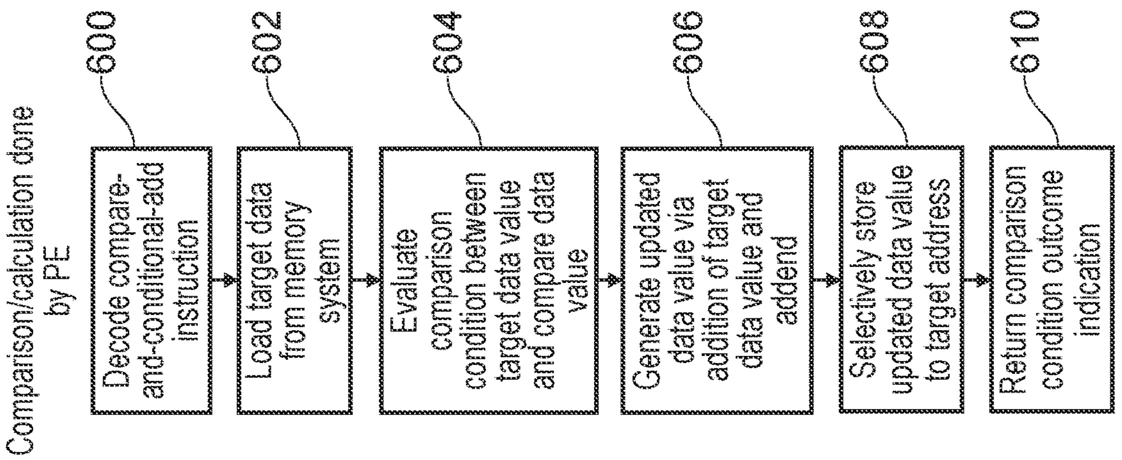
FIG. 6 is a flow diagram showing a process of responding to a compare-and-conditional-add instruction in a system where a processor is arranged to perform the atomic series of operations.

FIG. 6 is a flow diagram showing a process of responding to a compare-and-conditional-add instruction in a system where a processor is arranged to perform the atomic series of operations.

At step 600 the compare-and-conditional-add instruction is decoded. In response, at step 602 the processor issues a command to load the target data value from the memory system into a register, for example from a cache (which may be within the processor) or from memory. At step 604 the comparison condition indicated by the compare-and-conditional-add instruction is evaluated between the target data value and the compare data value within the processor (e.g., by the LSU). At step 606, an updated data value is generated by adding the addend data value and the target data value, and at step 608 the updated data value is selectively written to the storage location associated with the target address. In some examples, steps 604 and 606 could be performed in the reverse order (with step 606 occurring before step 604) or at least partially in parallel. At step 610, a comparison condition outcome indication is returned (e.g. to one or more general purpose registers, such as the register providing the addend data value). The comparison condition outcome indication specifies at least one of the target data value and the updated data value.

Figure 7B:
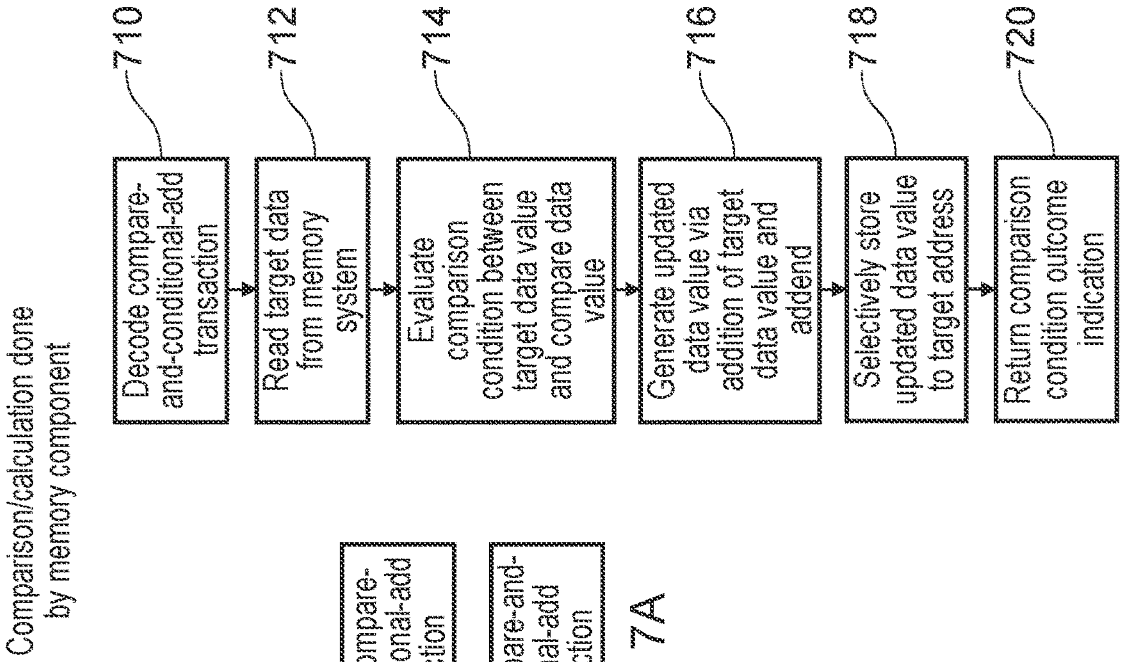
FIGS. 7A and 7B are flow diagrams illustrating a process of responding to a compare-and-conditional-add instruction in a system where a memory system component is arranged to perform the atomic series of operations.
Figure 7A:
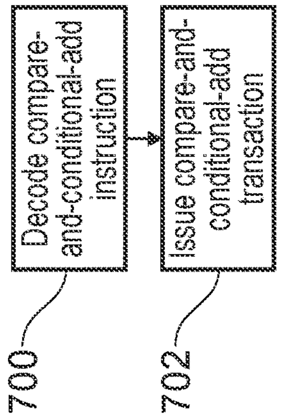

FIGS. 7A and 7B illustrate a process of responding to a compare-and-conditional-add instruction in a system where a memory system component is arranged to perform the atomic series of operations.

FIG. 7A illustrates steps taken by a processing element connected to a memory via a memory bus. At step 700 the processing element decodes a compare-and-conditional-add instruction, and in response to decoding the compare-and-conditional-add instruction, at step 702 issues a compare-and-conditional-add transaction over the memory bus.

FIG. 7B illustrates steps taken by a memory system component connected to the memory bus. At step 710 the compare-and-conditional-add transaction issued by the processing element is decoded. In response, at step 712 the memory system component reads a target data value from a storage location associated with the target address specified by the compare-and-conditional-add transaction. At step 714, the comparison condition between the target data value and compare data value is evaluated. At step 716 an updated data value is generated by adding the target data value and addend data value. At step 718, the updated data value is selectively stored to the storage location associated with the target address. At step 720, a comparison condition outcome indication is returned to the requester that issued the compare-and-conditional add transaction. The comparison condition outcome indication specifies at least one of the target data value and the updated data value. The comparison condition outcome indicator may be returned to the requester on the same read data path that would be used for providing read data in response to a memory read bus transaction.

Concepts described herein may be embodied in computer-readable code for fabrication of an apparatus that embodies the described concepts. For example, the computer-readable code can be used at one or more stages of a semiconductor design and fabrication process, including an electronic design automation (EDA) stage, to fabricate an integrated circuit comprising the apparatus embodying the concepts. The above computer-readable code may additionally or alternatively enable the definition, modelling, simulation, verification and/or testing of an apparatus embodying the concepts described herein.

For example, the computer-readable code for fabrication of an apparatus embodying the concepts described herein can be embodied in code defining a hardware description language (HDL) representation of the concepts. For example, the code may define a register-transfer-level (RTL) abstraction of one or more logic circuits for defining an apparatus embodying the concepts. The code may define a HDL representation of the one or more logic circuits embodying the apparatus in Verilog, SystemVerilog, Chisel, or VHDL (Very High-Speed Integrated Circuit Hardware Description Language) as well as intermediate representations such as FIRRTL. Computer-readable code may provide definitions embodying the concept using system-level modelling languages such as SystemC and SystemVerilog or other behavioural representations of the concepts that can be interpreted by a computer to enable simulation, functional and/or formal verification, and testing of the concepts.

Additionally or alternatively, the computer-readable code may define a low-level description of integrated circuit components that embody concepts described herein, such as one or more netlists or integrated circuit layout definitions, including representations such as GDSII. The one or more netlists or other computer-readable representation of integrated circuit components may be generated by applying one or more logic synthesis processes to an RTL representation to generate definitions for use in fabrication of an apparatus embodying the invention. Alternatively or additionally, the one or more logic synthesis processes can generate from the computer-readable code a bitstream to be loaded into a field programmable gate array (FPGA) to configure the FPGA to embody the described concepts. The FPGA may be deployed for the purposes of verification and test of the concepts prior to fabrication in an integrated circuit or the FPGA may be deployed in a product directly.

The computer-readable code may comprise a mix of code representations for fabrication of an apparatus, for example including a mix of one or more of an RTL representation, a netlist representation, or another computer-readable definition to be used in a semiconductor design and fabrication process to fabricate an apparatus embodying the invention. Alternatively or additionally, the concept may be defined in a combination of a computer-readable definition to be used in a semiconductor design and fabrication process to fabricate an apparatus and computer-readable code defining instructions which are to be executed by the defined apparatus once fabricated.

Such computer-readable code can be disposed in any known transitory computer-readable medium (such as wired or wireless transmission of code over a network) or non-transitory computer-readable medium such as semiconductor, magnetic disk, or optical disc. An integrated circuit fabricated using the computer-readable code may comprise components such as one or more of a central processing unit, graphics processing unit, neural processing unit, digital signal processor or other components that individually or collectively embody the concept.

Figure 8:
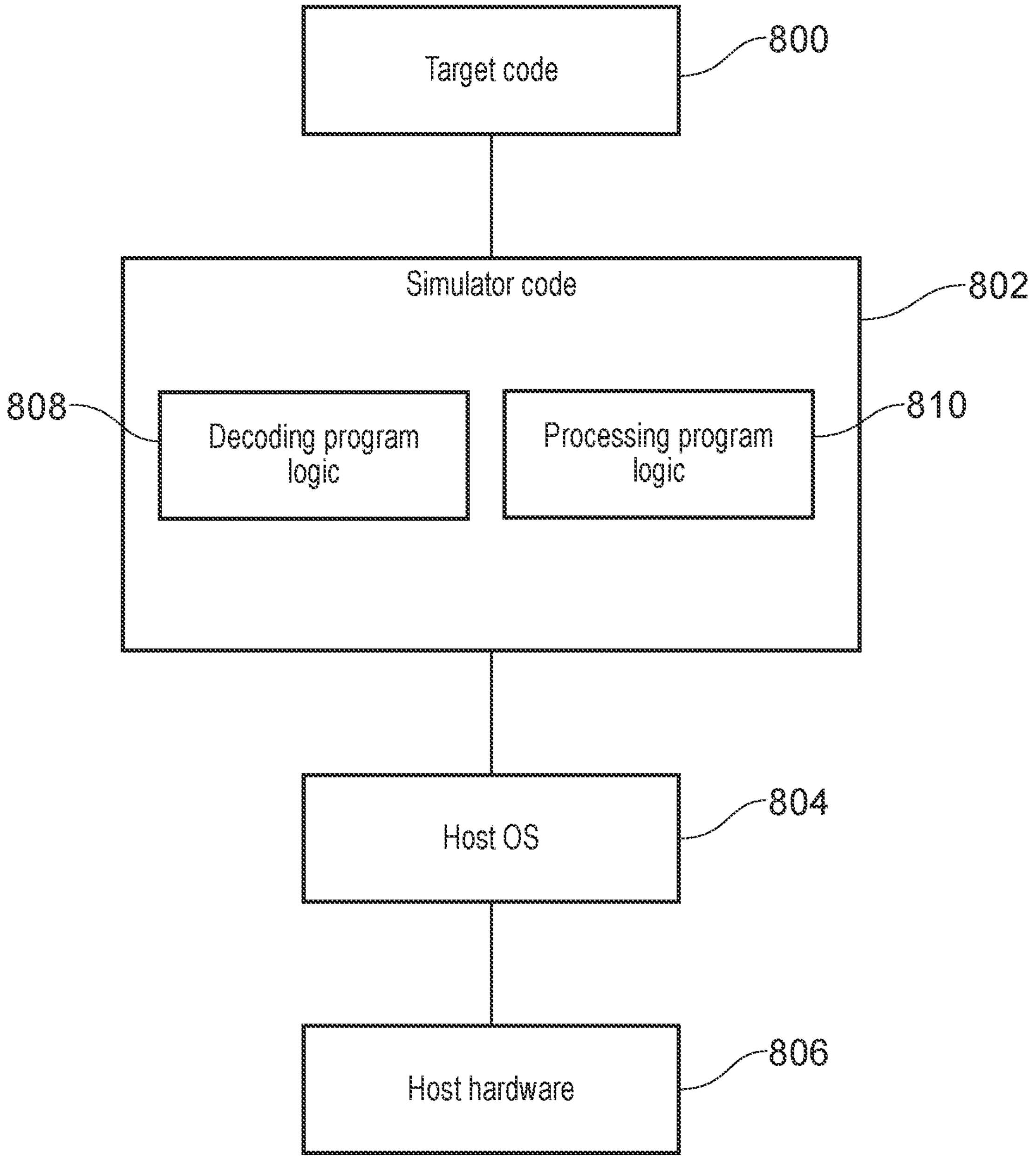
FIG. 8 illustrates a simulation example.

FIG. 8 illustrates a simulator implementation that may be used. Whilst the earlier described embodiments implement the present invention in terms of apparatus and methods for operating specific processing hardware supporting the techniques concerned, it is also possible to provide an instruction execution environment in accordance with the embodiments described herein which is implemented through the use of a computer program. Such computer programs are often referred to as simulators, insofar as they provide a software based implementation of a hardware architecture. Varieties of simulator computer programs include emulators, virtual machines, models, and binary translators, including dynamic binary translators. Typically, a simulator implementation may run on a host processor 806, optionally running a host operating system 804, supporting the simulator program 802. In some arrangements, there may be multiple layers of simulation between the hardware and the provided instruction execution environment, and/or multiple distinct instruction execution environments provided on the same host processor. Historically, powerful processors have been required to provide simulator implementations which execute at a reasonable speed, but such an approach may be justified in certain circumstances, such as when there is a desire to run code native to another processor for compatibility or re-use reasons. For example, the simulator implementation may provide an instruction execution environment with additional functionality which is not supported by the host processor hardware, or provide an instruction execution environment typically associated with a different hardware architecture. An overview of simulation is given in "Some Efficient Architecture Simulation Techniques", Robert Bedichek, Winter 1990 USENIX Conference, Pages 53-63.

To the extent that embodiments have previously been described with reference to particular hardware constructs or features, in a simulated embodiment, equivalent functionality may be provided by suitable software constructs or features. For example, particular circuitry may be implemented in a simulated embodiment as computer program logic. Similarly, memory hardware, such as a register or cache, may be implemented in a simulated embodiment as a software data structure. In arrangements where one or more of the hardware elements referenced in the previously described embodiments are present on the host hardware (for example, host processor 806), some simulated embodiments may make use of the host hardware, where suitable.

The simulator program 802 may be stored on a computer-readable storage medium (which may be a non-transitory medium), and provides a program interface (instruction execution environment) to the target code 800 (which may include applications, operating systems and a hypervisor) which is the same as the interface of the hardware architecture being modelled by the simulator program 802. Thus, the program instructions of the target code 800, including a compare-and-conditional-add instruction, may be executed from within the instruction execution environment using the simulator program 802, so that a host computer 806 which does not actually have the hardware features of the apparatus 2 discussed above can emulate these features.

The simulator code may include, for example, decoding program logic 808 to cause the host computer 806 to perform the functions of the decoding circuitry 100, and processing program logic 810 to cause the host computer 806 to perform the functions of the processing circuitry 102.

Some examples are set out in the following clauses:

(1) An apparatus, comprising:
- decoding circuitry configured to decode a compare-and-conditional-add command identifying a target address, compare data value, and addend data value; and
- processing circuitry responsive to the compare-and-conditional-add command to trigger an atomic set of operations to:
  - read a target data value from a storage location corresponding to the target address, and
  - selectively write an updated data value to the storage location in dependence on whether the compare data value satisfies a comparison condition with respect to the target data value read from the storage location,
- wherein the updated data value comprises a result of an addition of the target data value and the addend data value performed in response to the compare-and-conditional-add command; and the processing circuitry is configured to provide a comparison condition outcome indication indicating whether the compare data value satisfied the comparison condition, the comparison condition outcome indication comprising at least one of the target data value and the updated data value.

(2) The apparatus according to clause 1, wherein the comparison condition outcome indication comprises the target data value, regardless of whether or not the compare data value satisfied the comparison condition.

(3) The apparatus according to clause 1, wherein the comparison condition outcome indication comprises the updated data value, regardless of whether or not the compare data value satisfied the comparison condition.

(4) The apparatus according to clause 1, wherein the comparison condition outcome indication comprises both:
- the one of the target data value and the updated data value that corresponds to a final value stored at the storage location associated with the target address following completion of the atomic set of operations; and
- a comparison condition outcome indicator specifying whether the compare data value satisfied the comparison condition.

(5) The apparatus according to any preceding clause, wherein the encoding of the compare-and-conditional-add command identifies the comparison condition.

(6) The apparatus according to any preceding clause, wherein the atomic set of operations is a set of operations to be observed indivisibly.

(7) The apparatus according to any preceding clause, comprising an instruction decoder comprising the decoding circuitry, wherein the compare-and-conditional-add command comprises a compare-and-conditional-add instruction defined by an instruction set architecture.

(8) The apparatus according to clause 7, wherein the processing circuitry is configured to return the comparison condition outcome indication to a general purpose register.

(9) The apparatus according to any of clauses 7 and 8, wherein the compare-and-conditional-add instruction is configured to identify architectural registers associated with the compare data value and addend data value.

(10) The apparatus according to clause 9, wherein in response to the compare-and-conditional-add instruction, the processing circuitry is configured to return, to the architectural register associated with the addend data value, the target data value or the updated data value.

(11) The apparatus according to any of clauses 7 to 8, wherein the instruction decoder is responsive to at least one variant of the compare-and-conditional-add instruction to control the processing circuitry to prohibit memory access instructions later in program order than the compare-and-conditional-add instruction from being observed earlier than the compare-and-conditional-add instruction.

(12) The apparatus according to any of clauses 7 to 11, wherein the instruction decoder is responsive to at least one variant of the compare-and-conditional-add instruction to control the processing circuitry to prohibit memory access instructions earlier in program order than the compare-and-conditional-add instruction from being observed later than the compare-and-conditional-add instruction.

(13) The apparatus according to any preceding clause, wherein at least one memory system component comprises the decoding circuitry, and the compare-and-conditional-add command comprises a compare-and-conditional-add memory system bus command.

(14) The apparatus according to clause 13, wherein the memory system component is an interconnect for maintaining coherency between a requesting device and at least one other requesting device or cache.

(15) The apparatus according to clause 13, wherein the memory system component is a memory controller to control access to a memory.

(16) A system comprising the apparatus according to any of clauses 7 to 12 and at least one memory system component configured to trigger a read of the target data value from the storage location corresponding to the target address in response to the compare-and-conditional-add instruction.

(17) A system comprising the apparatus according to any of clauses 13 to 15 and at least one requesting device configured to issue the compare-and-conditional-add memory system bus command.

(18) A computer-readable medium to store computer-readable code for fabrication of the apparatus of any of clauses 1 to 17.

(19) A method, comprising:

decoding a compare-and-conditional-add command identifying a target address, compare data value, and addend data value; and responsive to the compare-and-conditional-add command, triggering an atomic set of operations comprising:

reading a target data value from a storage location corresponding to the target address, and selectively writing an updated data value to the storage location in dependence on whether the compare data value satisfies a comparison condition with respect to the target data value read from the storage location, wherein the updated data value comprises a result of an addition of the target data value and the addend data value performed in response to the compare-and-conditional-add command; and the method comprises providing a comparison condition outcome indication indicating whether the compare data value satisfied the comparison condition, the comparison condition outcome indication comprising at least one of the target data value and the updated data value.

(20) A computer program for controlling a host data processing apparatus to provide an instruction execution environment, the computer program comprising:

decoding program logic configured to decode a compare-and-conditional-add command identifying a target address, compare data value, and addend data value; and processing program logic responsive to the compare-and-conditional-add command to trigger an atomic set of operations to:

read a target data value from a storage location corresponding to the target address, and selectively write an updated data value to the storage location in dependence on whether the compare data value satisfies a comparison condition with respect to the target data value read from the storage location, wherein the updated data value comprises a result of an addition of the target data value and the addend data value performed in response to the compare-and-conditional-add command; and the processing program logic is configured to provide a comparison condition outcome indication indicating whether the compare data value satisfied the comparison condition, the comparison condition outcome indication comprising at least one of the target data value and the updated data value.

In the present application, the words "configured to . . . " are used to mean that an element of an apparatus has a configuration able to carry out the defined operation. In this context, a "configuration" means an arrangement or manner of interconnection of hardware or software. For example, the apparatus may have dedicated hardware which provides the defined operation, or a processor or other processing device may be programmed to perform the function. "Configured to" does not imply that the apparatus element needs to be changed in any way in order to provide the defined operation.

In the present application, lists of features preceded with the phrase "at least one of" mean that any one or more of those features can be provided either individually or in combination. For example, "at least one of: A, B and C" encompasses any of the following options: A alone (without B or C), B alone (without A or C), C alone (without A or B), A and B in combination (without C), A and C in combination (without B), B and C in combination (without A), or A, B and C in combination.

Although illustrative embodiments of the invention have been described in detail herein with reference to the accompanying drawings, it is to be understood that the invention is not limited to those precise embodiments, and that various changes and modifications can be effected therein by one skilled in the art without departing from the scope of the invention as defined by the appended claims.

The invention claimed is:

1. An apparatus, comprising:

decoding circuitry configured to decode a compare-and-conditional-add command identifying a target address, compare data value, and addend data value; and processing circuitry responsive to the compare-and-conditional-add command to trigger an atomic set of operations to:

read a target data value from a storage location corresponding to the target address, and selectively write an updated data value to the storage location in dependence on whether the compare data value satisfies a comparison condition with respect to the target data value read from the storage location, wherein the updated data value comprises a result of an addition of the target data value and the addend data value performed in response to the compare-and-conditional-add command; and the processing circuitry is configured to provide a comparison condition outcome indication indicating whether the compare data value satisfied the comparison condition, the comparison condition outcome indication comprising at least one of the target data value and the updated data value;

wherein the comparison condition outcome indication comprises the updated data value, regardless of whether or not the compare data value satisfied the comparison condition.

2. The apparatus according to claim 1, wherein the comparison condition outcome indication comprises the target data value, regardless of whether or not the compare data value satisfied the comparison condition.

3. The apparatus according to claim 1, wherein at least one memory system component comprises the decoding circuitry, and the compare-and-conditional-add command comprises a compare-and-conditional-add memory system bus command.

4. The apparatus according to claim 3, wherein the at least one memory system component is an interconnect for maintaining coherency between a requesting device and at least one other requesting device or cache.

5. The apparatus according to claim 3, wherein the at least one memory system component is a memory controller to control access to a memory.

6. A system comprising the apparatus according to claim 3 and at least one requesting device configured to issue the compare-and-conditional-add memory system bus command.

7. A non-transitory computer-readable medium to store computer-readable code for fabrication of the apparatus of claim 1.

8. An apparatus, comprising:

decoding circuitry configured to decode a compare-and-conditional-add command identifying a target address, compare data value, and addend data value; and processing circuitry responsive to the compare-and-conditional-add command to trigger an atomic set of operations to:

read a target data value from a storage location corresponding to the target address, and selectively write an updated data value to the storage location in dependence on whether the compare data value satisfies a comparison condition with respect to the target data value read from the storage location, wherein the updated data value comprises a result of an addition of the target data value and the addend data value performed in response to the compare-and-conditional-add command; and the processing circuitry is configured to return to a register or to a requester a comparison condition outcome indication indicating whether the compare data value satisfied the comparison condition, the comparison condition outcome indication comprising at least one of the target data value and the updated data value;

wherein the comparison condition outcome indication comprises both:

the one of the target data value and the updated data value that corresponds to a final value stored at the storage location associated with the target address following completion of the atomic set of operations; and a comparison condition outcome indicator specifying whether the compare data value satisfied the comparison condition.

9. The apparatus according to claim 1, wherein an encoding of the compare-and-conditional-add command identifies the comparison condition.

10. The apparatus according to claim 1, wherein the atomic set of operations is a set of operations to be observed indivisibly.

11. The apparatus according to claim 1, comprising an instruction decoder comprising the decoding circuitry, wherein the compare-and-conditional-add command comprises a compare-and-conditional-add instruction defined by an instruction set architecture.

12. The apparatus according to claim 11, wherein the processing circuitry is configured to return the comparison condition outcome indication to a general purpose register.

13. The apparatus according to claim 11, wherein the compare-and-conditional-add instruction is configured to identify architectural registers associated with the compare data value and the addend data value.

14. The apparatus according to claim 13, wherein in response to the compare-and-conditional-add instruction, the processing circuitry is configured to return, to an architectural register associated with the addend data value, the target data value or the updated data value.

15. The apparatus according to claim 11, wherein the instruction decoder is responsive to at least one variant of the compare-and-conditional-add instruction to control the processing circuitry to prohibit memory access instructions later in program order than the compare-and-conditional-add instruction from being observed earlier than the compare-and-conditional-add instruction.

16. The apparatus according to claim 11, wherein the instruction decoder is responsive to at least one variant of the compare-and-conditional-add instruction to control the processing circuitry to prohibit memory access instructions earlier in program order than the compare-and-conditional-add instruction from being observed later than the compare-and-conditional-add instruction.

17. A system comprising the apparatus according to claim 11 and at least one memory system circuit configured to trigger a read of the target data value from the storage location corresponding to the target address in response to the compare-and-conditional-add instruction.

* * * * *